US009501328B2

(12) United States Patent
Robatmili et al.

(10) Patent No.: US 9,501,328 B2
(45) Date of Patent: Nov. 22, 2016

(54) METHOD FOR EXPLOITING PARALLELISM IN TASK-BASED SYSTEMS USING AN ITERATION SPACE SPLITTER

(71) Applicant: QUALCOMM Incorporated, San Diego, CA (US)

(72) Inventors: Behnam Robatmili, San Jose, CA (US); Shaizeen Dilawarhusen Aga, Ann Arbor, MI (US); Dario Suarez Gracia, Santa Clara, CA (US); Arun Raman, Santa Clara, CA (US); Aravind Natarajan, Sunnyvale, CA (US); Gheorghe Calin Cascaval, Palo Alto, CA (US); Pablo Montesinos Ortego, Fremont, CA (US); Han Zhao, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/673,857

(22) Filed: Mar. 30, 2015

(65) Prior Publication Data

US 2016/0292012 A1    Oct. 6, 2016

(51) Int. Cl.
*G06F 9/46*    (2006.01)
*G06F 9/50*    (2006.01)

(52) U.S. Cl.
CPC .......... *G06F 9/5066* (2013.01); *G06F 9/5027* (2013.01)

(58) Field of Classification Search
CPC ............................ G06F 9/5066; G06F 9/5027
USPC ......................................................... 718/104
See application file for complete search history.

(56) References Cited

U.S. PATENT DOCUMENTS

| 8,478,967 | B2 | 7/2013 | Bordelon et al. |
|---|---|---|---|
| 8,813,091 | B2 | 8/2014 | Maessen et al. |
| 2005/0210472 | A1 | 9/2005 | Accapadi et al. |
| 2009/0300333 | A1 | 12/2009 | Harper, III |
| 2013/0191817 | A1 | 7/2013 | Vorbach |
| 2015/0268993 | A1* | 9/2015 | Montesinos Ortego ................. G06F 9/4881 718/106 |

OTHER PUBLICATIONS

Lanti D., "Sharing Information in Parallel Search with Search Space Partitioning," Apr. 3, 2013, 69 Pages.
Raman R., et al., "Compiler Support for Work-Stealing Parallel Runtime Systems," 2010, 20 pages.
(Continued)

*Primary Examiner* — Camquy Truong
(74) *Attorney, Agent, or Firm* — The Marbury Law Group, PLLC

(57) ABSTRACT

Embodiments include computing devices, systems, and methods for task-based handling of repetitive processes in parallel. At least one processor of the computing device, or a specialized hardware controller, may be configured to partition iterations of a repetitive process and assign the partitions to initialized tasks to be executed in parallel by a plurality of processor cores. Upon completing a task, remaining divisible partitions of the repetitive process of ongoing tasks may be subpartitioned and assigned to the ongoing task, and the completed task or a newly initialized task. Information about the iteration space for a repetitive process may be stored in a descriptor table, and status information for all partitions of a repetitive process stored in a status table. Each processor core may have an associated local table that tracks iteration execution of each task, and is synchronized with the status table.

18 Claims, 12 Drawing Sheets

(56) References Cited

OTHER PUBLICATIONS

International Search Report and Written Opinion—PCT/US2016/018651—ISA/EPO—May 24, 2016.
Kumar S., et al., "Carbon", ACM Proceedings of the 34th Annual International Symposium on Computer Architecture (ISCA '97), Jun. 9, 2007 (Jun. 9, 2007),-Jun. 13, 2007 (Jun. 13, 2007), p. 162, XP055265609, San Diego, California DOI: 19.1145/1250662.1250683ISBN: 978-1-59593-706-3.
Sanchez D., et al., "Flexible Architectural Support for Fine-Grain Scheduling", Proceedings of the Fifteenth Edition of ASPLOS on Architectural Support for Programming Languages and Operating Systems, ASPLOS '19, Mar. 13, 2010 (Mar. 13, 2010),-Mar. 17, 2010 (Mar. 17, 2010), p. 311, XP055265613, New York, New York, USA DOI: 10.1145/1736020.1736055 ISBN: 978-1-60558-839-1.
Tzannes A., et al., "Lazy Binary-Splitting", ACM SIGPLAN Notices, vol. 45, No. 5, May 1, 2010 (May 1, 2010), p. 179, XP055265337, 2 Penn Plaza, Suite 701 New York NY 10121-0701 USA ISSN: 0362-1340, DOI: 10.1145/1837853.1693479.
Yizhuo W., et al., "A Hierarchical Work-Stealing Framework for Multi-Core Clusters", 2012 13th International Conference on Parallel and Distributed Computing, Applications and Technologies, IEEE, Dec. 14, 2012 (Dec. 14, 2012), pp. 350-355, XP032479790, DOI: 10.1109/PDCAT.2012.17 ISBN: 978-0-7695-4879-1 [retrieved on Sep. 5, 2013].

* cited by examiner

METHOD FOR EXPLOITING PARALLELISM IN TASK-BASED SYSTEMS USING AN ITERATION SPACE SPLITTER

BACKGROUND

A common concept in computer programming is the execution of one or more instructions repetitively according to a given criterion. This repetitive execution can be accomplished by programming using recursion, fixed point iteration, or looping constructs. In various instances computer programs can include repetitions of processes in which at repetitive process may execute a certain number of times according to a criterion. For instance, if the repetitive process criterion directs the repetitive process to execute "n" number of times, the total number of executions of the repetitive process can be as great as "n" executions.

In some computer systems with multiple processors or multi-core processors, execution of processes can be run in parallel with each other on the multiple processors or cores. Such parallel execution of repetitive processes can improve the performance of the computer system. For example, in a computer system with four or more processors or processor cores, if the repetitive process criterion directs the repetitive process to execute n number of times, n can be split into p divisions, for example n0, n1, n2, . . . np. The p divisions of n can each represent a subset of the number of times to execute the repetitive process. The repetitive process can be assigned to execute on respective processors or processor cores for one of the subsets n0, n1, n2, . . . np.

However, in many computer systems, this does not alleviate an issue with the overall overhead involved in executing repetitive processes. In a task-based run-time system, a separate task can be created for each execution of the p divisions of each repetitive process. The greater the number of tasks, the greater an amount of overhead is created for managing all of the tasks.

SUMMARY

The methods and apparatuses of various embodiments provide circuits and methods for task-based handling of repetitive processes in multi-technology communication devices. Embodiment methods may include detecting, by a processor or processor core of a multi-technology communications device, a repetitive process ready for execution; initializing, by a central controller of the processor or processor, a set of descriptor table entries for iteration space information of the repetitive process; initializing, by the central controller of the processor or processor core, a set of status table entries for iteration space information of the repetitive process; partitioning, by the central controller of the processor or processor core, iterations of the repetitive process into a first plurality of partitions; initializing, by the central controller of the processor or processor core, a first task for executing iterations of a first partition; initializing, by the central controller of the processor or processor core, a second task for executing iterations of a second partition; assigning, by the central controller of the processor or processor core, the first task to execute by a first processor or processor core and the second task to execute by a second processor or processor core in parallel; updating, by multiple local controllers each associated with one of the processors or processor cores, multiple local tables to include partition execution status information for a task assigned to execute on the respective processor or processor core, wherein each table is associated with one of the processors or processor cores; and executing the first task by the first processor or processor core and executing the second task by the second processor or processor core in parallel.

Some embodiments may include completing, by the second processor or processor core, execution of the second task; updating, by the local controller associated with the second processor or processor core, the local table associated with the second processor or processor core to indicate that the second task has finished execution; updating, by the central controller of the processor, the status table to indicate that the second task has finished completion and the second processor or processor core is available; determining, by the central controller of the processor, whether the first partition is divisible; and partitioning, by the central controller of the processor, the first partition of the first task into a second plurality of partitions in response to determining that the first partition is divisible. Such embodiments may further include, assigning, by the central controller of the processor, a third partition of the second plurality of partitions to the second task for execution, and a fourth partition of the second plurality of partitions to the first task for execution; updating, by the central controller of a processor, the status table with at least the additional number of partitions, task assignment information, and task iteration status; and updating, by multiple local controllers, each local controller associated with one of the processors or processor cores, multiple local tables, each table associated with one of the processors or processor cores, to include updated partition execution information for a task assigned to execute on the respective processor core. Alternatively, some of such embodiments, each of the partitions of the second plurality of partitions may be of any size. Alternatively, in some of such embodiments, determining whether the first partition is divisible further comprises determining, by the central controller of the processor, whether the remaining iterations of partitions assigned to the first task exceeds a minimum threshold.

Some embodiments may include partitioning, by the central controller of the processor, the iterations of the repetitive process by a number of partitions equivalent to a number of available processors or processor cores.

Some embodiments may include initializing, by a local controller associated with the first processor or processor core, a first pointer in the local table associated with the first processor or processor core for the first task; updating, by the local controller of the first processor or processor core, the first pointer to indicate execution of the iterations of the repetitive process of the first partition; and updating, by the central controller of the processor, an execution status of the first partition in the status table.

Some embodiments may include determining, by the local controller of the first processor or processor core, that an end iteration criterion for the first partition is invalid; updating, by the local controller of the first processor or processor core, a local table associated with the first processor or processor core to reflect the new end iteration criterion for the first partition; and updating, by the central controller, the status table with the new end iteration criterion for the first partition.

In some embodiments, updating any of the local tables further comprises requesting, by the central controller of the processor, partition information contained in a local table.

In some embodiments, updating any of the local tables further comprises passing, by the local controller of a respective processor or processor core, information updated in a local table to the status table at predetermined intervals or in response to an event.

In some embodiments, the status table or any of the local tables may be updated without interrupting execution of the tasks by the processors or processor cores.

Some embodiments may further include completing, by the processors or processor cores, execution of all partitions of a repetitive process, deleting, by the local controllers of the multiple processor cores, the partition entries associated with the repetitive process from each of the local tables, and deleting, by the central controller, iteration space information from the status table and descriptor table.

Embodiments include a multi-technology communication device having multiple processors or processor cores configured with processor-executable instructions to perform operations of one or more of the embodiment methods described above.

Embodiments include a multi-technology communication device having means for performing functions of one or more of the embodiment methods described above.

Embodiments include a non-transitory processor-readable medium having stored thereon processor-executable software instructions to cause a processor to perform operations of one or more of the embodiment methods described above.

BRIEF DESCRIPTION OF THE DRAWINGS

The accompanying drawings, which are incorporated herein and constitute part of this specification, illustrate example embodiments of the invention, and together with the general description given above and the detailed description given below, serve to explain the features of the invention.

DETAILED DESCRIPTION

Figure 1:
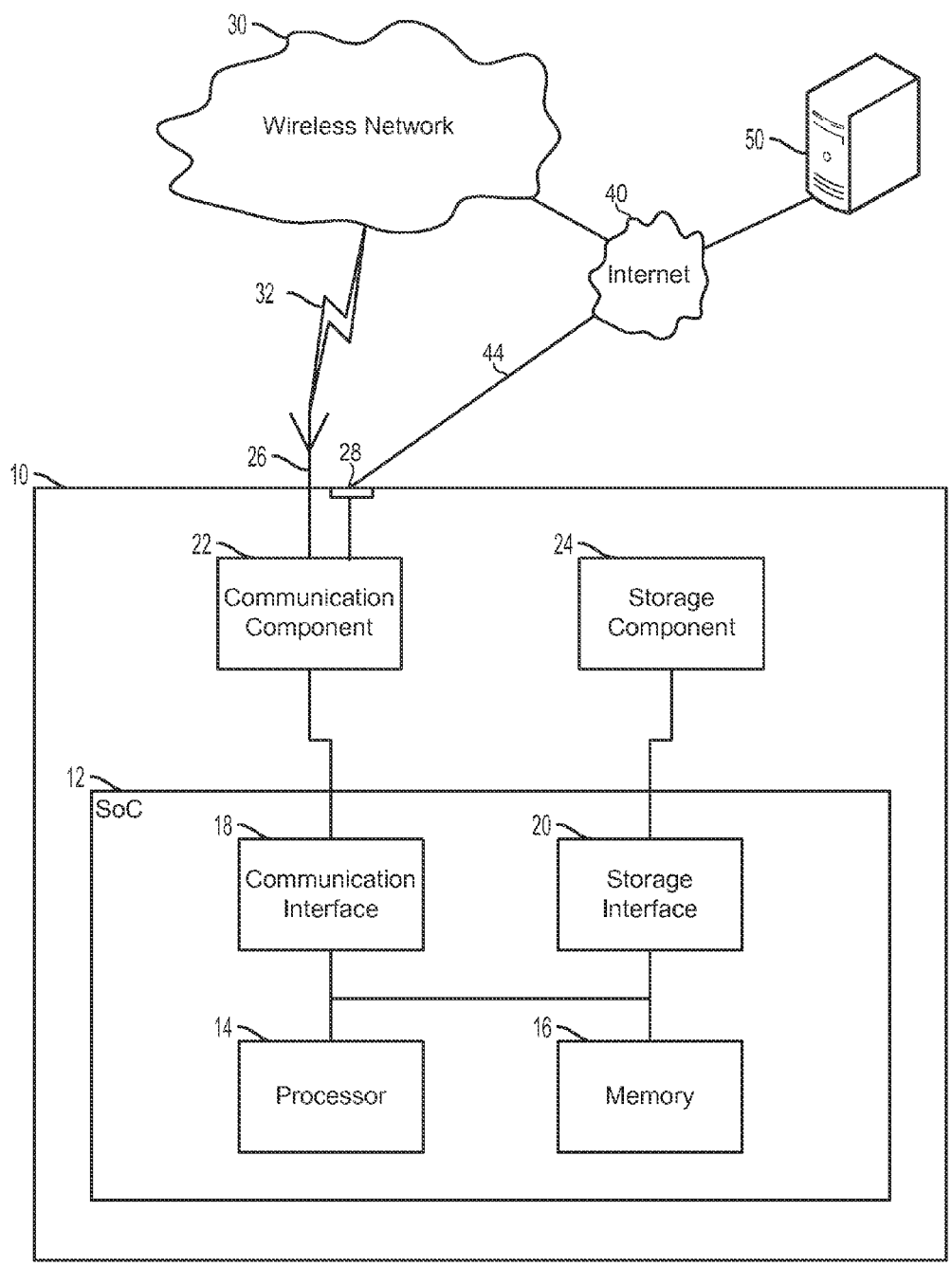
FIG. 1 is a component block diagram of an example computing device suitable for implementing an embodiment.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The term "computing device" is used herein to refer to any one or all of cellular telephones, smartphones, personal or mobile multi-media players, personal data assistants (PDA's), personal computers, laptop computers, tablet computers, smartbooks, ultrabooks, palm-top computers, wireless electronic mail receivers, multimedia Internet enabled cellular telephones, wireless gaming controllers, desktop computers, computer servers, data servers, telecommunication infrastructure rack servers, video distribution servers, application specific servers, and similar personal or commercial electronic devices which include a memory, and one or more programmable multi-core processors.

The terms "system-on-chip" (SoC) and "integrated circuit" are used interchangeably herein to refer to a set of interconnected electronic circuits typically, but not exclusively, including multiple hardware cores, a memory, and a communication interface. The hardware cores may include a variety of different types of processors, such as a general purpose multi-core processor, a multi-core central processing unit (CPU), a multi-core digital signal processor (DSP), a multi-core graphics processing unit (GPU), a multi-core accelerated processing unit (APU), and a multi-core auxiliary processor. A hardware core may further embody other hardware and hardware combinations, such as a field programmable gate array (FPGA), an application-specific integrated circuit (ASCI), other programmable logic device, discrete gate logic, transistor logic, performance monitoring hardware, watchdog hardware, and time references. Integrated circuits may be configured such that the components of the integrated circuit reside on a single piece of semiconductor material, such as silicon. Such a configuration may also be referred to as the IC components being on a single chip.

In an embodiment, a process executing in a scheduler, within or separate from an operating system, for a multi-processor or multi-core processor system may reduce the overhead of repetitive processes (e.g., loops) in task-based run-time systems employing parallel processing, across multiple processors or processor cores, of load balancing one execution of one or more repetitive processes across the multiple processors or processor cores. In an embodiment, the iteration space of a repetitive process may be stored in a descriptor table in a memory location, along with information regarding the function to be executed at each iteration of the repetitive process. In an embodiment, the repetitive process may have a criterion to execute until a relationship to a value n is realized. The relationship between the repetition value and the value n may be any arithmetic or logical relationship. To employ parallel processing of the repetitive process, tasks may be initialized for subsets, or partitions, of the criterion. For example, if the criterion is to repeat the repetitive process for each value between a starting value and the value n by incrementing the repetition value until it equals n, then the task may be assigned a subset of the repetitions between the starting value and the value n.

The number of tasks, represented here by p, and how they are assigned their respective subsets may vary. In an embodiment, the number of tasks may be equal to the number of available processors or processor cores. For example, with four available processors or processor cores (i.e., p=4), four subsets may be initialized, represented here by n0, n1, n2, and n3, and four tasks t may be initialized, represented here by t0, t1, t2, and t3. Each subset may be associated with a task t, such as n0 with t0, n1 with t1, n2 with t2, and n3 with t3. In an embodiment, information regarding the assignment of tasks, along with information about respective task criterion may be stored in a master status table in a memory location. Information may be passed from the descriptor table to the status table to enable assignment iterations of the repetitive process to the one or more processors or processor cores.

During execution of the tasks, the computer system may store a pointer, or other type of reference, for each task to a local table in a memory location accessible by processor or processor core executing the task and indicating the progress of the task. With each iteration of the repetitive processes of the tasks, the respective pointers may be updated. In an embodiment, the local tables may be synched with the master status table to ensure that the master table reflects progress through the iteration space across all processors or processor cores.

In an embodiment in which the task completes its iterations, i.e., the repetition value for the task equals a final repetition value for the task's subset of n, the processor may discard the task. While one task may complete, one or more of the other tasks may continue to execute. Discarding the completed task may make the respective processor or processor core that executed the completed task available for other work. While at least one task is still executing, the scheduler may further divide the subset of the executing task into one or more new subsets, or subpartitions, and initialize one or more tasks to execute for the new subsets on the now available processor(s) or processor core(s). In an embodiment, rather than discarding completed tasks, while other tasks continue to execute, the scheduler may reassign the completed task to a new subset of the further divided subset.

FIG. 1 illustrates a system that may implement various embodiments. With respect to FIG. 1 a computing device 10 that may include an SoC 12 with a processor 14, a memory 16, a communication interface 18, and a storage interface 20. The computing device may further include a communication component 22 such as a wired or wireless modem, a storage component 24, an antenna 26 for establishing a wireless connection 32 to a wireless network 30, and/or the network interface 28 for connecting to a wired connection 44 to the Internet 40. The computing device 10 may communicate with a remote computing device 50 over the wireless connection 32 and/or the wired connection 44. The processor 14 may comprise any of a variety of hardware cores as described above. The SoC 12 may include one or more processors 14. The computing device 10 may include one or more SoCs 12, thereby increasing the number of processors 14. The computing device 10 may also include processors 14 that are not associated with an SoC 12. The processors 14 may each be configured for specific purposes that may be the same or different from other processors 14 of the computing device 10. Further, individual processors 14 may be multi-core processors as described below with reference to FIG. 2.

The computing device 10 and/or SoC 12 may include one or more memories 16 configured for various purposes. The memory 16 may be a volatile or non-volatile memory configured for storing data and processor-executable code for access by the processor 14. In an embodiment, the memory 16 may be configured to, at least temporarily, store data related to tasks of repetitive processes as described herein. In some embodiments, the iteration space splitter may be implemented with multiported SRAM cells to provide simultaneous memory access. As discussed in further detail below, each of the processor cores of the processor 14 may assigned a task comprising a subset, or partition, of the n iterations of the repetitive process by a scheduler of a high level operating system running on the computing device 10.

The communication interface 18, communication component 22, antenna 26 and/or network interface 28, may work in unison to enable the computing device 10 to communicate over a wireless network 30 via a wireless connection 32, and/or a wired connection 44 with the remote computing device 50. The wireless network 30 may be implemented using a variety of wireless communication technologies, including, for example, radio frequency spectrum used for wireless communications, to provide the computing device 10 with a connection to the Internet 40 by which it may exchange data with the remote computing device 50.

The storage interface 20 and the storage component 24 may work in unison to allow the computing device 10 to store data on a non-volatile storage medium. The storage component 24 may be configured much like an embodiment of the memory 16 in which the storage component 24 may store the data related to tasks of repetitive processes, such that the data may be accessed by one or more processors 14. The storage interface 20 may control access the storage device 24 and allow the processor 14 to read data from and write data to the storage device 24.

It should be noted that some or all of the components of the computing device 10 may be differently arranged and/or combined while still serving the necessary functions. Moreover, the computing device 10 may not be limited to one of each of the components, and multiple instances of each component, in various configurations, may be included in the computing device 10

Figure 2:
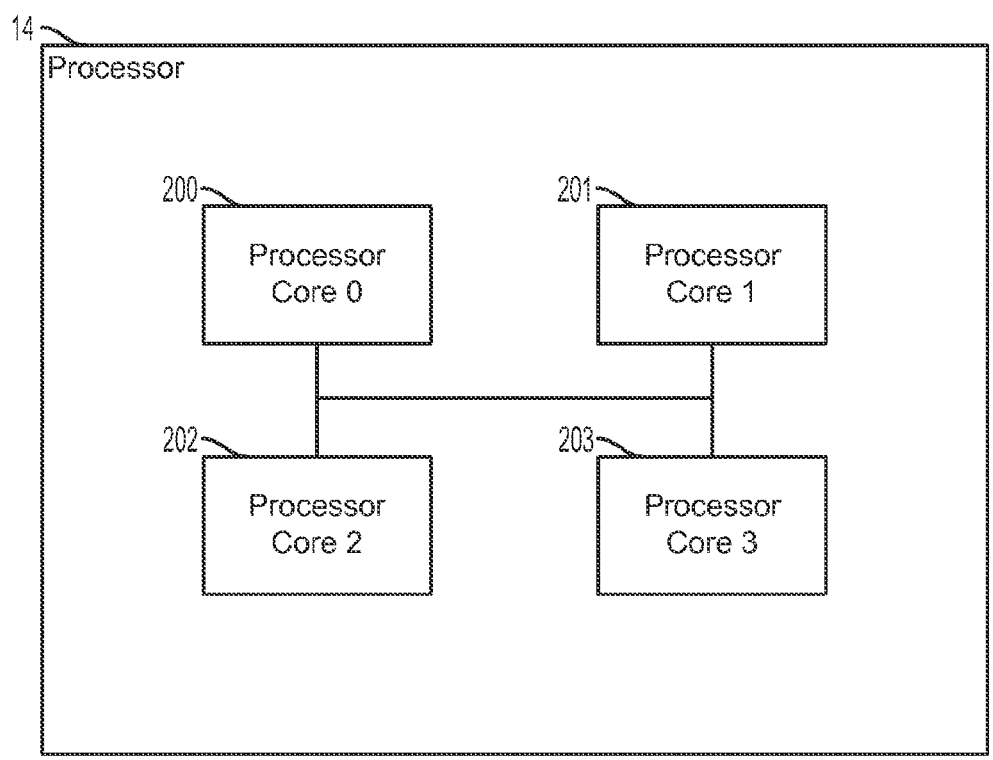
FIG. 2 is a component block diagram of an example multi-core processor suitable for implementing an embodiment.

FIG. 2 illustrates a multi-core processor 14 suitable for implementing various embodiments. With respect to FIGS. 1-2, the multi-core processor 14 may have a plurality of processor cores 200, 201, 202, 203. In an embodiment, the processor cores 200, 201, 202, 203 may be equivalent processor cores in that, processor cores 200, 201, 202, 203 of a single processor 14 may be configured for the same purpose and to have the same performance characteristics. For example, the processor 14 may be a general purpose processor, and the processor cores 200, 201, 202, 203 may be equivalent general purpose processor cores. Alternatively, the processor 14 may be a graphics processing unit or a digital signal processor, and the processor cores 200, 201, 202, 203 may be equivalent graphics processor cores or digital signal processor cores, respectively. Through variations in the manufacturing process and materials, it may result that the performance characteristics of the processor cores 200, 201, 202, 203 may differ from processor core to processor core, within the same multi-core processor 14 or in another multi-core processor 14 using the same designed processor cores. In an embodiment, the processor cores 200, 201, 202, 203 may include a variety of processor cores that are nonequivalent. For example, some of the processor cores 200, 201, 202, 203 may be configured for the same or different purposes and to have the same or different performance characteristics. In an embodiment, the processor cores 200, 201, 202, 203 may include a combination of equivalent and nonequivalent processor cores.

In the example illustrated in FIG. 2, the multi-core processor 14 includes four processor cores 200, 201, 202, 203, (i.e., processor core 0, processor core 1, processor core 2, and processor core 3). For ease of explanation, the examples herein may refer to the four processor cores 200, 201, 202, 203 illustrated in FIG. 2. However, it should be noted that FIG. 2 and the four processor cores 200, 201, 202, 203 illustrated and described herein are in no way meant to be limiting. The computing device 10, the SoC 12, or the multi-core processor 14 may individually or in combination include fewer or more than the four processor cores 200, 201, 202, 203.

Figure 3:
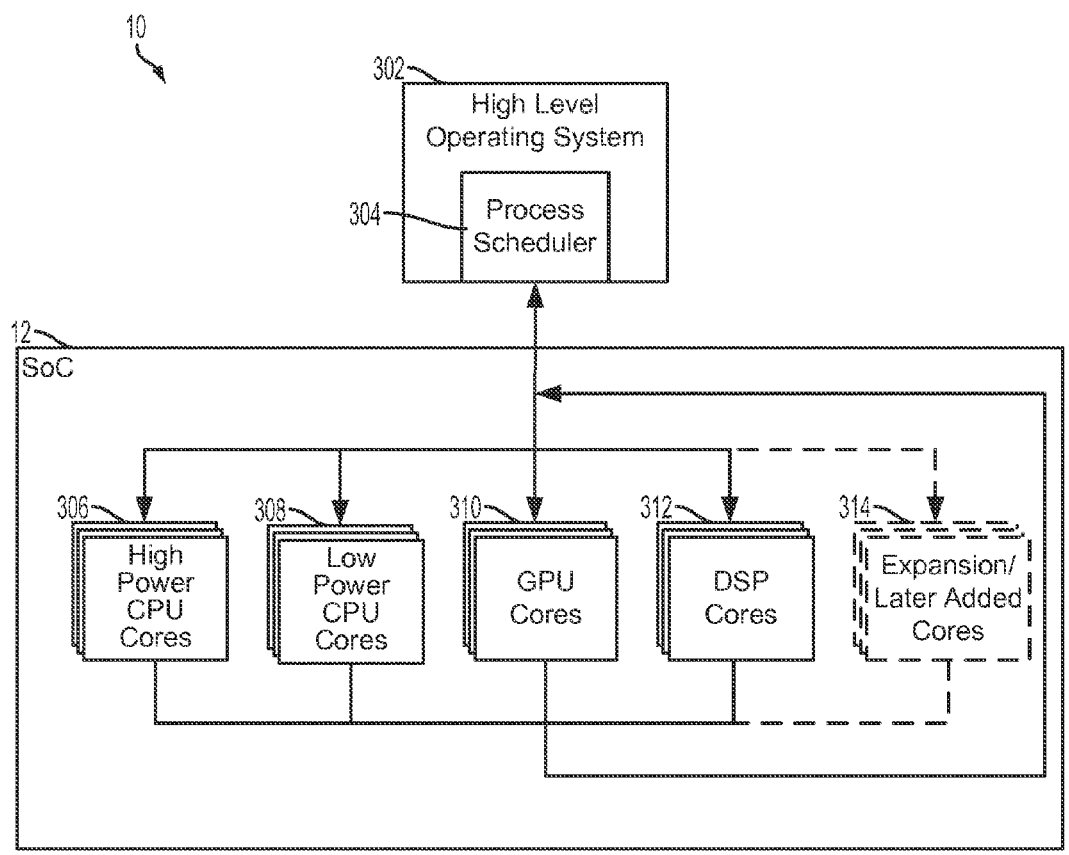
FIG. 3 is a functional and component block diagram of a system-on-chip suitable for implementing an embodiment.

FIG. 3 illustrates a computing device 10 having an SoC 12 including multiple processor cores 306, 308, 310, 312, 314 suitable for implementing various embodiments. With respect to FIGS. 1-3, the computing device 10 may also include a high level operating system 302, which may be configured to communicate with the components of the SoC 12 and operate a process or task scheduler 304 for managing the processes or tasks assigned to the various processor cores 306, 308, 310, 312, 314. In various embodiments, the task scheduler 304 may be a part of or separate from the high level operating system 302.

Different types of multi-core processors are illustrated in FIG. 3, including a high performance/high leakage multi-core general purpose/central processing unit (CPU) 306 (referred to as a "high power CPU core" in the figure), a low performance/low leakage multi-core general purpose/central processing unit (CPU) 308 (referred to as a "low power CPU core" in the figure), a multi-core graphics processing unit (GPU) 310, a multi-core digital signal processor (DSP) 312, and other processor cores 314.

FIG. 3 also illustrates that processor cores 314 may be installed in the computing device after it is sold, such as an expansion or enhancement of processing capability or as an update to the computing device. After-market expansions of processing capabilities are not limited to central processor cores, and may be any type of computing module that may be added to or replaced in a computing system, including for example, additional, upgraded or replacement modem processors, additional or replacement graphics processors (GPUs), additional or replacement audio processors, and additional or replacement DSPs, any of which may be installed as single-chip-multi-core modules or clusters of processors (e.g., on an SoC). Also, in servers, such added or replaced processor components may be installed as processing modules (or blades) that plug into a receptacle and wiring harness interface.

Each of the groups of processor cores illustrated in FIG. 3 may be part of a multi-core processor 14 as described above. Moreover, these five example multi-core processors (or groups of processor cores) are not meant to be limiting, and the computing device 10 or the SoC 12 may individually or in combination include fewer or more than the five multi-core processors 306, 308, 310, 312, 314 (or groups of processor cores), including types not displayed in FIG. 3.

Various embodiments may include methods, systems, and devices for allowing applications to implement iteration space splitters in hardware. The execution of partitions of repetitive processes across multiple processor cores may be assisted or controlled through the use of instruct set architecture (ISA) extensions, special register read/write instructions, designated memory addresses, via memory mapped input/output (MMIO) accelerator devices and/or by using one or more coprocessors.

Figure 4:
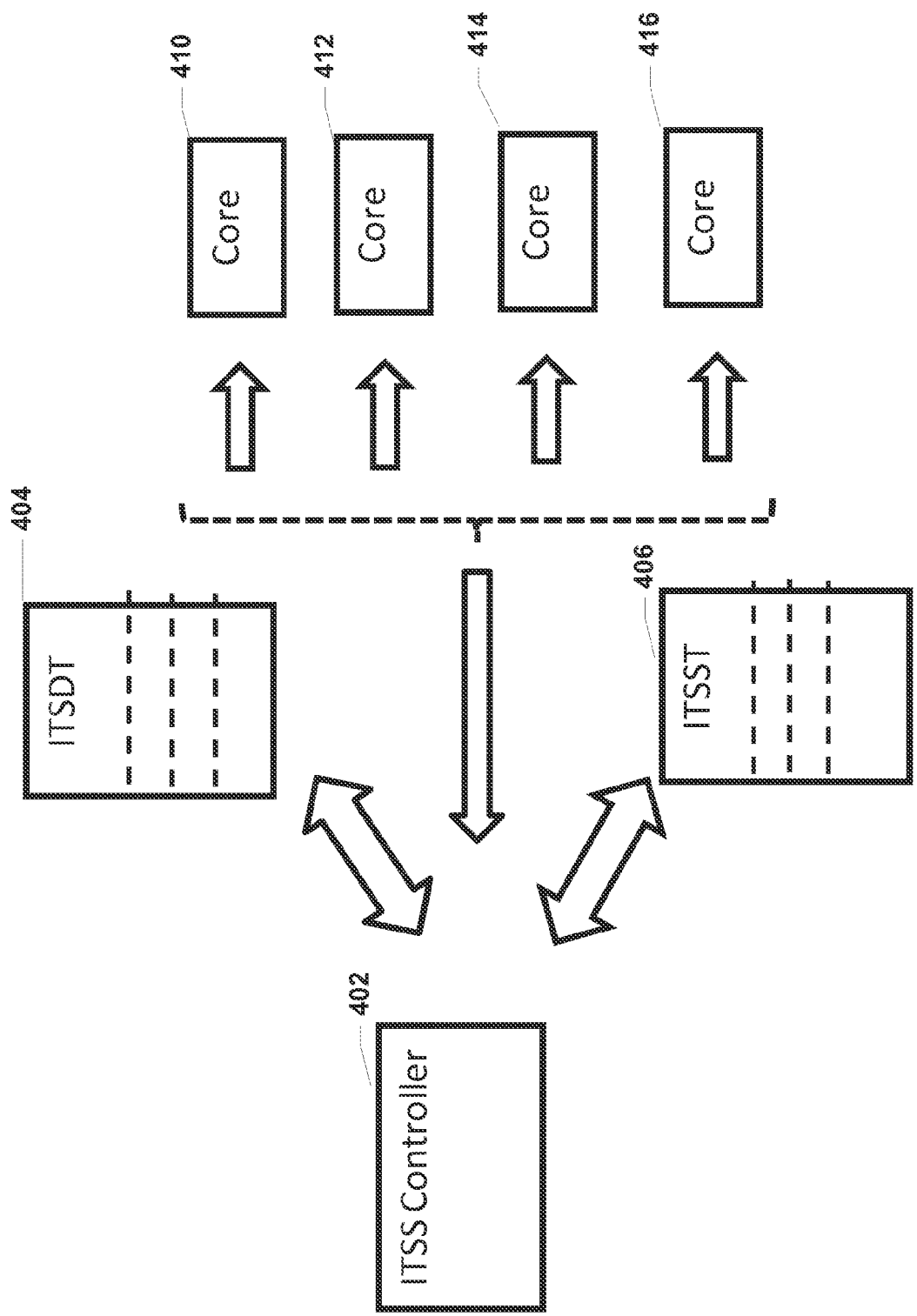
FIG. 4 is a diagram of task-based handling of repetitive processes in accordance with an embodiment.

FIG. 4 illustrates an embodiment workflow of task-based handling of repetitive processes. An embodiment of an iteration space splitter implemented in hardware may include an iteration space splitter controller 402 ("central controller"), which may control initialization, updating, and deletion of entries of an iteration space descriptor table 404 ("descriptor table") in a memory location. An iteration space splitter implemented in hardware may also include an iteration space status table 406 ("status table") in a memory location responsible for tracking execution of iterations of one or more repetitive processes on multiple processor cores 410, 412, 414, 416. A local controller may be associated with each of the processor cores 410, 412, 414, 416 to control tracking of repetitive process iterations assigned to a respective processor core and relay status information to the descriptor table 404 and status table 406. Local tables assigned to memory locations may correspond to each of the processor cores 410, 412, 414, 416 and may hold information regarding progress of individual iterations of partitions of one or more repetitive processes.

In various embodiments, software may require the execution of multiple repetitive processes (e.g., loops) during regular operation. To improve speed of execution completion, modern processors may enable load balancing across multiple processor cores by splitting the iteration space and assigning portions of the repetitive process execution to different processor cores. Because the number of iterations required to complete execution of a repetitive process may vary throughout execution, iteration space splitting techniques must be dynamic. Software based dynamic partitioning schemes require the storage of the iteration space in shared memory, which may be inspected by processor cores to determine if partitions may be subdivided further. Such approaches may lead to cache pollution resulting from numerous processor core inspection and synchronization efforts, as well as coherence traffic.

Various embodiments may include methods, systems, and devices for implementing the dynamic iteration space splitting scheme in hardware using a descriptor table 404, a status table 406, and multiple local tables, all located in cache memory. The central controller 402 may partition the iterations of the repetitive process and assign each partition to a different processor or processor core 410, 412, 414, 416. In doing so, the computing device may process the partitions in parallel. Unlike software based solutions, a hardware based approach enables parallel messaging between the central controller and the processor or processor cores, efficient iteration status lookup, and parallel work stealing. For example, multiple processors or processor cores may request and be assigned subpartitions of a partition being executed on another processor or processor core, at the same time and without interrupting execution. Thus, the implementation of an iteration space splitter in hardware may enable repetitive process scheduling, assignment and execution without requiring intervention from the run-time or operating systems, and consequently may improve the function of a computing device implementing various embodiments.

The central controller may determine the size of various partitions and to which processor or processor core to assign each partition based on various criteria. For example, the central controller may size and allocate partitions based on the type, the performance characteristics, and/or the availability of the processor or processor core, and/or the type, the resource requirements, and/or the latency tolerance of the execution of repetitive processes. Granularity of partition size may be any size, including very small numbers of iterations, thereby enabling precision load balancing across multiple processor cores. Further, partition granularity may be dynamic and may be adjusted by the central controller as needed during execution without interrupting already executing partitions of the repetitive process.

Figure 5A:
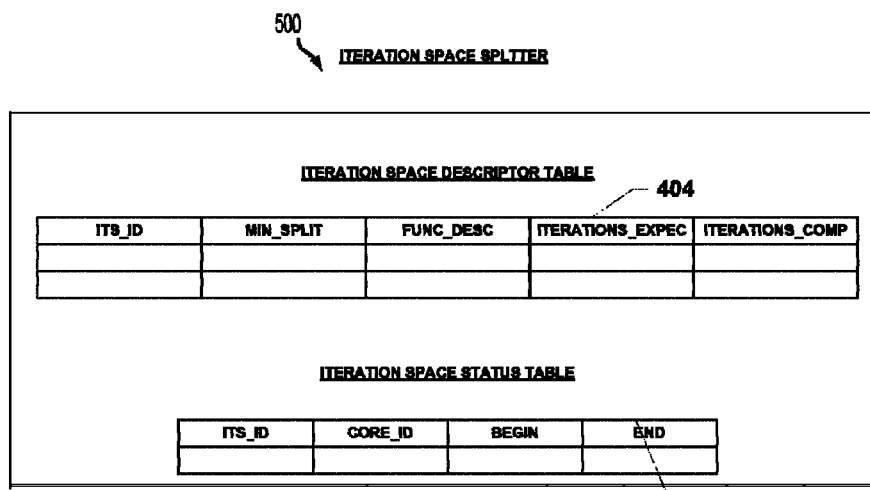
FIGS. 5A-C are diagrams of task-based handling of repetitive processes in accordance with an embodiment.
Figure 5B:
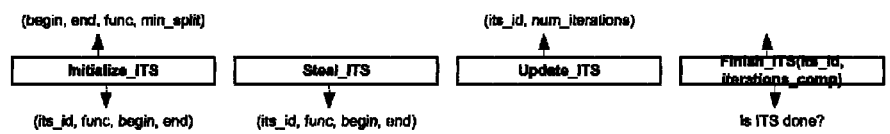
Figure 5C:
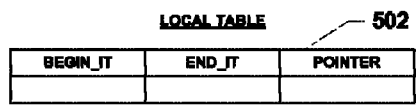

FIGS. 5A-C illustrate an embodiment of an iteration space splitter for task-handling of execution of repetitive processes. Various embodiments of an iteration space splitter for load-balancing of execution of repetitive processes across multiple processor cores may include a descriptor table 404 and a status table 406 implemented in memory. In some embodiments, the descriptor table 404 may be primarily purposed with maintaining metadata for one or more iteration spaces being executed or queued for execution by the multiple processor cores. In some embodiments, the status table 406 may be responsible for maintaining status information for partitions of one or more iteration spaces that are being executed or are queued for execution on the multiple processor cores. Respective assignments of multiple partitions of the iteration space of a repetitive processor may be maintained in the fields of the status table 406 until all iterations of all partitions are completed.

In various embodiments, the descriptor table 404 may have multiple fields for maintaining metadata for multiple iteration spaces. A non-limiting example of an iteration space splitter 500 including a descriptor table 404 and a status table 406 is shown in FIG. 5A. A first field of the descriptor table 404 may be designated for maintaining iteration space identifiers. At the time of initialization, each iteration space may be assigned an identifier, which may be used to track execution progress across the multiple processor cores. A second field may be designated for minimum partition size. The minimum partition size or minimum split size may be an optional parameter that indicates the smallest number of iterations that may be assigned to any partition. Thus, a partition of minimum size may not be subpartitioned further. A third field may be designated for iteration space function descriptors. In some embodiments, function descriptors may be the instructions to be executed in each iteration of the iteration space of the repetitive process. In some embodiments, the function descriptor may be a stub describing the instructions to be executed, or a pointer to the instructions. In heterogeneous devices, the function descriptor may be a table of pointers to different instructions. A fourth field may be designated for the expected number of iterations, which may be calculated from beginning and ending iterations input. A fifth field may be designated for the number of iterations completed, and may be updated as execution of repetitive process partitions progresses.

In various embodiments, the status table 406 may have several fields maintaining information about repetitive process partition assignments. Some embodiments may include a first field designated for iteration space identifiers. Iteration space identifiers may be generated during initialization of the iteration space, and may be used by the central controller to cross-correlate one or more partitions of a repetitive process. A second field may designate the processor core identifier, which may be an identifier from a group of predetermined identifiers, each assigned to a different processor core. A third field may designate the beginning iteration count, and a fourth field may designate the end iteration count. Thus, a processor core assigned iterations 1-40 of a repetitive process may have a different set of table entries than a processor core assigned to execution iterations 41-80, even though their overall partition size may be the same.

Multiple atomic operations may be included to enable insertion, removal, and editing of table entries. As shown in FIG. 5B, an initializing operation (e.g., an initialize_its operation) may provide the iteration space splitter with parameters, such as beginning of iterations, end of iterations, function to be executed, and an optional minimum split size. This information may be added to the descriptor table 404, the expected iterations calculated, and an iteration space identifier generated. The iteration space identifier, beginning and end information, and function to be executed may be used by the central controller to split the iteration space into multiple partitions. The central controller may assign the multiple partitions to one or more processor cores depending upon the size of the iteration space partitions and processor core availability. Assignment information may be maintained in the status table 406 and individual partition information passed to local tables 506 associated with each of the processors or processor cores. As shown in FIG. 5C, each local table 502 may include entries for beginning and end criteria of a partition as well as a pointer for tracking the current iteration or previous iteration of the task executing iterations of the partition.

Subpartitions of active iteration space partitions may be created by the central controller and implemented using a "steal_its" operation. A processor core that completes all its assigned iterations may be available for additional work. The central controller executing a steal_its operation may "steal" a portion of an active partition from another processor core and reassign it to the available processor core, thereby reducing the load on the active core and increasing the speed of overall execution. An "update_its" operation may be used to update the information in the iteration space status table 406 and descriptor table 404 when work is stolen, completed, or new iterations are found. Updates to the start and end iterations of a partition may be passed to the local table 506 to enable the local controller to track progress of task execution through the partition.

Partitions that the central controller deems completed may be checked against local tables of the processor cores using a "finish_its" operation. Completed partitions may optionally remain in the status table until all partitions are complete and the iteration space is ready for deletion from the descriptor table 404 and the status table 406. In this manner, the central controller may manipulate partition sizes, update iteration fields, and delete entries associated with completed partitions or iteration spaces.

Figure 6:
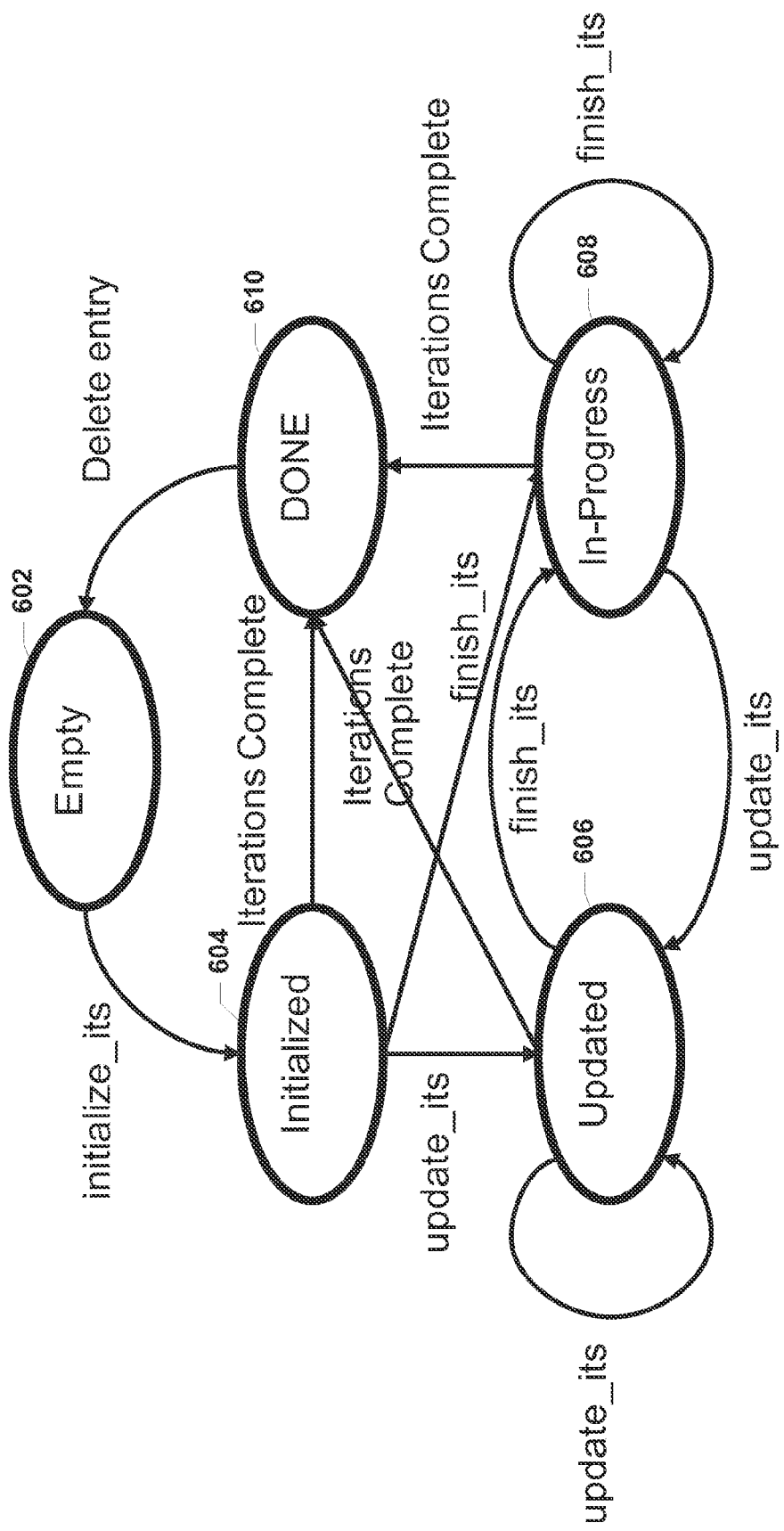
FIG. 6 is a state diagram of task-based handling of repetitive processes in accordance with an embodiment.

FIG. 6 illustrates an embodiment of workflow states of a task-based handling of repetitive processes. With reference to FIGS. 1-6, the descriptor table 404 may be implemented in a cache memory of the computing device 10 and may have elements that transition through multiple states during operation. The descriptor table may be empty 602 prior to detection by executing software of any repetitive processes. Once one or more repetitive processes are discovered and deemed ready for execution, an iteration space may be initialized, such as by the initialize_its operation. Information about the repetitive process may be maintained in the table as discussed with respect to FIG. 5. After entries for a particular iteration space are added to the descriptor table 404, the iteration space may be referred to as initialized 604. Information associated with the initialized iteration space may be passed to the status table 406 for partitioning of the execution assignments.

During execution of tasks handling iteration execution, the processor cores or the requesting software program may discover additional iterations of the repetitive process. For example, if an end execution criterion is no met, the repetitive process may repeat, such as in a "while" loop with an unsatisfied condition. In some embodiments, one or more local controllers associated with each of the multiple processors may pass a message to the central controller indicating that additional iterations have been discovered and a local table has been updated to reflect the new end execution criterion. The central controller 402 may update the descriptor table 404 to reflect the additional iterations, thereby modifying the expected number of iterations. Modifications to the descriptor table 604 entries may transition the respective iteration space into an updated state 606. In some embodiments, the iteration space may enter the updated state 606 several times during execution of the iteration space. In some embodiments, the iteration space may never enter an updated state 606 and may proceed directly from an initialized state 604 to an in progress state 608, or a done state 610.

In various embodiments, the iteration spaces maintained in the descriptor table 404 may enter an in progress state 608 after being initialized or updated. In some embodiments, a finish_its operation may indicate that execution of a partition should commence or continue, and may place an iteration space in an in-progress state 608. The in-progress state may indicate that at least one partition of the iteration space has not completed executing all iterations of a repetitive process. Conversely, if all iterations of all partitions of a repetitive process have finished executing then the iteration space is done 610 and may be deleted from the descriptor table 404.

Figure 7:
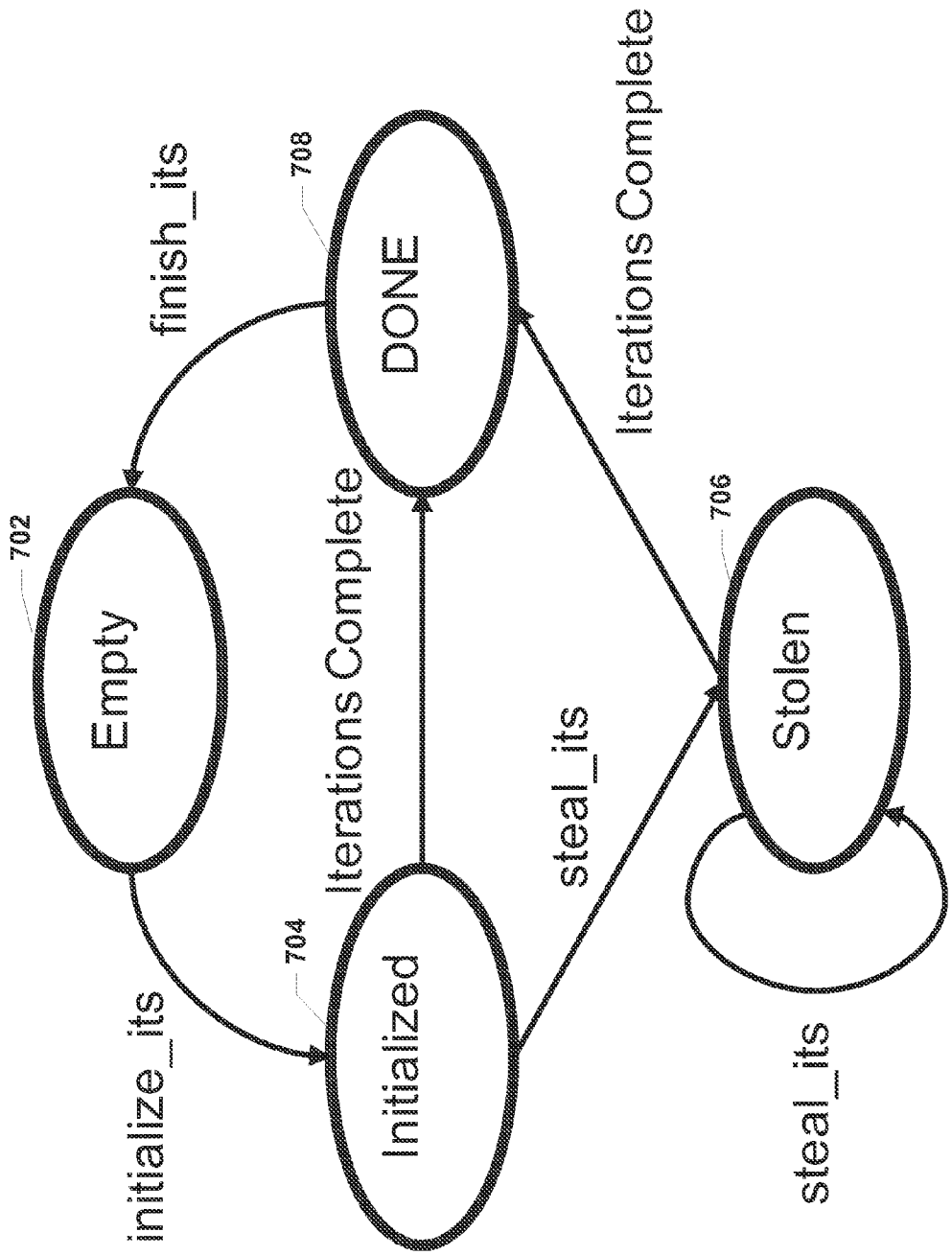
FIG. 7 is a state diagram of task-based handling of repetitive processes in accordance with an embodiment.

FIG. 7 illustrates an embodiment of workflow states of a task-based handling of repetitive processes. The status table 406 may be implemented in a cache memory of the computing device 10 and may have elements that transition through multiple states during operation. Prior to partitioning of iterations of a repetitive process the status table elements may be in an empty state 702. In various embodiments, when an iteration space is initialized 604, entries may be made in the descriptor table 404 and an iteration space identifier may be generated. A portion of the information entered into the descriptor table 404 along with the iteration space identifier may be added to the status table 406, thereby placing the entry in the status table into an initialized state 704. The central controller 402 may determine whether to partition the iterations of the iteration space based on a variety of factors. If no partitioning is needed to complete all of the iterations of the repetitive process, the central controller may initialize a single task for executing the repetitive process and assign the task to a single processor core. Once the task has finished executing and all iterations are complete, the iteration space may transition to a done state 708.

The central controller may determine that the best execution of the iteration space requires dividing the workload of execution across multiple processor cores. In various embodiments, the central controller may compare the iteration space size against the minimum split size stored in the descriptor table 404 and may generate multiple tasks and partitions having any number of iterations (e.g., any number greater than the minimum split size). In an embodiment, the number of tasks may be equal to the number of partitions as described above, or to the number available processors or processor cores. For example, with four available processors or processor cores (see FIG. 2) (i.e., p=4), four tasks may be initialized. Each task may be associated with a processor or processor core. For example, task t0 may be associated with processor core 0, task t1 processor core 1, task t2 with processor core 1, and task tp with processor core 3. Some embodiments may include consideration of each processor core's current workload prior to partitioning.

As processor cores become available to receive new tasks, they may request work from the central controller, which may subdivide existing partitions to reduce load on an active processor core and provide work for the available processor core. Upon completion of a task or completion of the iterations assigned to the task, the processor or processor core that executed the task may be available for executing further tasks. The remaining tasks having more than one iteration of the respective partition of the repetitive process to execute may be reassigned a subpartition of the respective partition, and the completed task may be assigned another subpartition of the same partition. Thus, in an embodiment, a partition assigned to a task, where the task has yet to begin executing at least the last iteration of the partition, may be split into subpartitions so that one or more of the yet to be executed iterations of the partition may be reassigned to an available processor or processor core to increase the speed of executing the iterations of a repetitive process. This reallocation is referred to herein as "work stealing" and may be initiated using a steal_its operation.

Each partitioning and subpartitioning of the iteration space may transition the partition into a stolen state 706. Stolen partitions may be continuously subpartitioned so long as the minimum split size is honored, if one is specified during initialization. Once all tasks are finished executing their respective partitions, the partition may enter the done state 708. Completion of partitions may be passed in a message to the descriptor table, which may be updated to indicate that an iteration space is in progress 608 or done 610.

Figure 8:
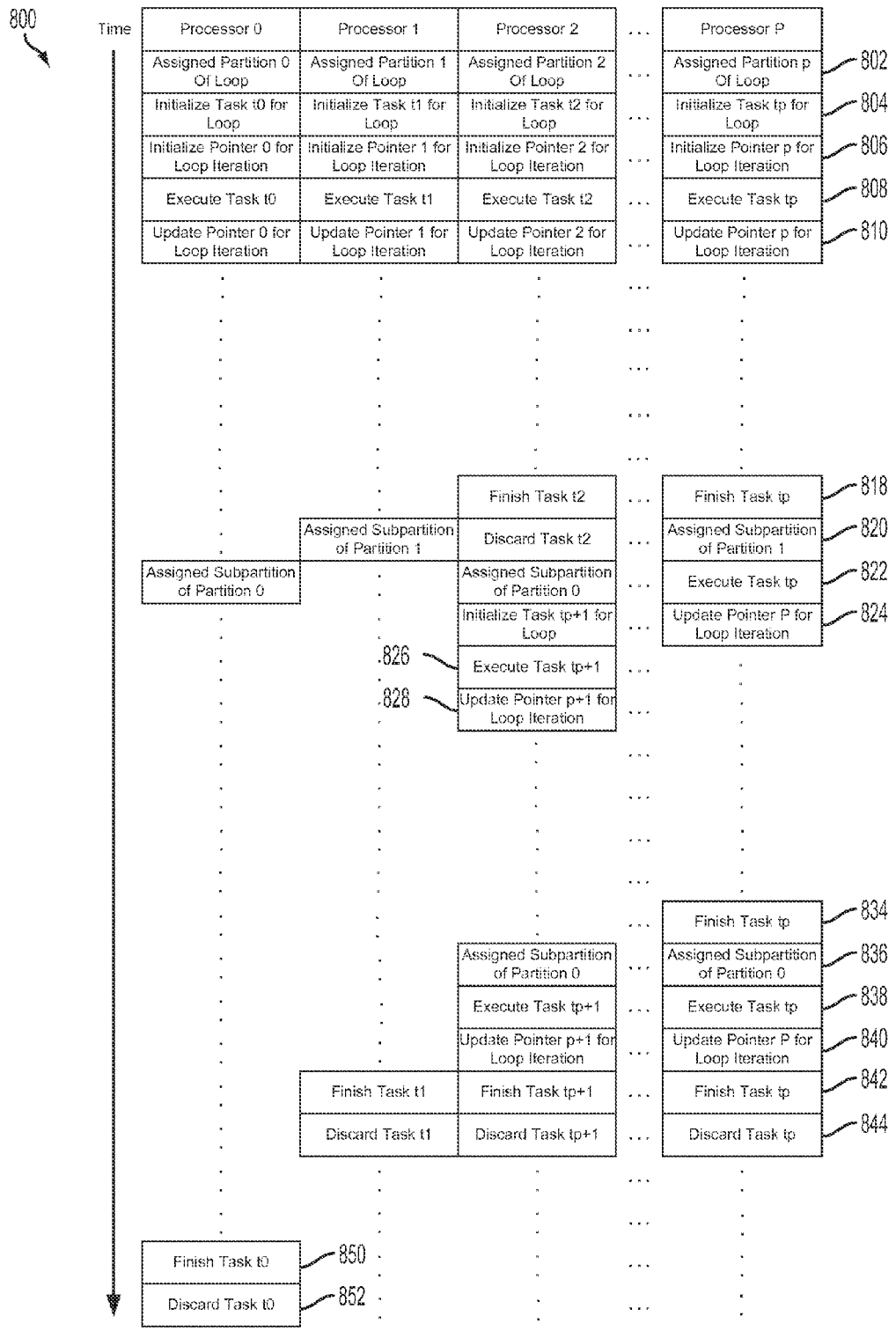
FIG. 8 is a chart diagram of task-based handling of repetitive processes in accordance with an embodiment.

FIG. 8 illustrates an example chart 800 of task-based handling of repetitive processes. The chart 800 illustrates an example time progression of the states of four processors or processor cores (processor 0, processor 1, processor 2, and processor p) implementing task-based handling of repetitive processes. The use of four processors or processor cores in this example is not meant to be limiting, and similar task-based handling of repetitive processes may be implemented using more or fewer than four processors or processor cores. In the example illustrated in row 802 of the chart 800, each of the processors or processor cores may be assigned a respective partition of iterations of a repetitive process. Processor 0 may be assigned partition 0, processor 1 may be assigned partition 1, processor 2 may be assigned partition 2, and processor p may be assigned partition p. In row 804, tasks may be initialized for executing the iterations of the respective partitions of the repetitive process assigned to each processor or processor core. In this example, task t0 may be initialized for partition 0 and processor 0, task t1 may be initialized for partition 1 and processor 1, task t2 may be initialized for partition 2 and processor 2, and task tp may be initialized for partition p and processor p.

Also in row 806, a pointer or other reference type may be initialized for the respective tasks. In various embodiments, the pointer may be maintained in a local table associated with each of the processors or processor cores. Each local table may have entries for beginning and ending criteria of the iteration space partition, and may maintain a pointer to the most recently executed iteration. In this example, pointer 0 may be initialized for task t0, pointer 1 may be initialized for task t1, pointer 2 may be initialized for task t2, and pointer p may be initialized for task tp. The pointers may be used to track the progress of the execution of the repetitive processes for their respective tasks, and the pointers may be accessible by the central controller for use in determining which partitions have sufficient remaining iterations to permit subpartitioning. In an embodiment, a pointer may be initialized for each of one or more repetitive processes for each task. The task may access the pointer of the respective task to identify the repetitive process iteration of the task when instructed to execute In row 808, each of the processors or processor cores may begin to execute their respective tasks. Executing the tasks may include executing the assigned partitions of the iterations of the repetitive processes.

In row 810, the processors or processor cores may update the respective pointers to indicate the start or completion of execution of the repetitive processes of the respective tasks. Throughout the execution of the tasks, the pointers may be repeatedly updated to indicate the iteration of the repetitive processes for being executed. In some embodiments, the central controller may query the local table for pointer position and use this information to update the descriptor table and status table. In some embodiments, a local controller associated with each of the processors or processor cores, may push pointer position to the central controller at regular intervals. The central controller may use the received information to update the descriptor table and status table. In some embodiments, a local controller associated with each of the processors or processor cores may use the pointer positions to calculation iterations completed, and update the descriptor table and status table directly.

In this example, processor 2 and processor p may implement different schemes. The scheme for processor 2 may include discarding the completed task t2 in row 820 after the task finishes in row 818. In row 822, processor 2 may be assigned a subpartition of one of the ongoing tasks being executed by another of the processors or processor cores. The subpartition may be one or more iterations of the repetitive process that has/have yet to be executed by one of the ongoing tasks. The partition of the remaining iterations of the ongoing task may be divided into two or more subpartitions, and the subpartitions may be assigned to tasks. One of the subpartitions may be assigned to the original task of the partition, and the other subpartition(s) may be assigned to other new or existing but completed tasks. In this example, partition 0 of ongoing task t0 being executed on processor 0 may include unexecuted iterations of the repetitive process. Partition 0 may be divided into two subpartitions, one of which may be assigned to processor 0 and task t0, and the other may be assigned to processor 2 and a newly initialized task tp+1 in rows 822 and 824. Much like above, in row 824 processor 2 may initialize a pointer (or other reference type) for the respective task, and in row 826 processor 2 may begin executing task tp+1. In an embodiment, initializing the pointer may involve initializing a new pointer for the task, or updating the existing pointer. Also as described above, in row 828 during the execution of task tp+1, the respective pointer for task tp+1 may be updated for the current or last executed iteration of the repetitive process.

The scheme for processor p differs from the scheme for processor 2 described above in that rather than discarding the completed task and initializing a new task to execute a subpartition of the iterations of the repetitive process, processor p uses the existing completed task. In this example, partition 1 of ongoing task t1 being executed on processor 1 may include unexecuted iterations of the repetitive process. Partition 1 may be divided into two subpartitions, one of which may be assigned to processor 1 and task t1 and the other of which may be assigned to processor p and existing completed task tp in row 820. Much like above, in row 822 processor p may begin executing task tp for the subpartition, and update the respective pointer for the iteration of the repetitive process for task tp in row 824. In this example scheme, there is no need to initialize a new pointer as they both may exist from the previous execution of task tp; however, a new pointer may be initialized if so desired.

For the respective scheme implemented to engage the available processor or processor core with further task execution, several of the states in the above described rows 818, 820, 822, 824, 826 and 828 may be repeated to complete execution of the tasks for all of the iterations of the respective subpartitions of the repetitive process each of the processors or processor cores. Depending on various factors, such as the ones described above, one or more of the tasks may complete executing at the same or different times. For example, in row 834, task tp may finish executing, while tasks t0, t1, and tp+1 may continue to execute, but in row 842 tasks t1, tp+1, and tp may finish at the same time, while task t0 nay continue to execute. In an embodiment, where only one ongoing task remains, and the ongoing task is executing the final iteration of its partition of the iterations of the repetitive process, the partition cannot be subpartitioned to assign iterations of the repetitive process to the available processors or processor cores.

In an embodiment, the central controller may assign further subpartitions of an ongoing repetitive process as processors or processor cores become available. For example, in row 834 task tp may finishing executing and processor tp may become available for execution of more iterations of the repetitive process. Partition 0 may be the largest remaining partition despite previous subpartitioning in row 822. As such, task tp+1's subpartition may be further subpartitioned and assigned a portion reassigned to task tp+1 and the remaining portion assigned to task tp in row 836. In an embodiment, tasks tp+1 and tp may execute their respective iterations of partition 0 in row 838. In row 840 the tasks may update respective pointers to keep track of the started or completed iterations of the repetitive process. Upon completion of all iterations of assigned partitions of a repetitive process, the completed tasks from row 842, task t1, task tp+1 and task tp, may be discarded in row 844.

While the final ongoing task continues to execute its last iteration, several of the states in the above described rows may be repeated to aid in executing the iterations of the repetitive process when necessary. In row 850 the final ongoing task, task t0 in this example, may complete its execution. With no remaining repetitive process iterations, task t0 may be discarded in row 852.

It should be noted that the various described states of the processors or processor cores may occur in a different order than in the examples described herein. The descriptions of FIGS. 4-8 are not meant to be limiting as to the order or number of processors or processor cores, states, tasks, shadow tasks, partitions, subpartitions, pointers or other reference types, iterations, processes, or any other element described herein.

Figure 9:
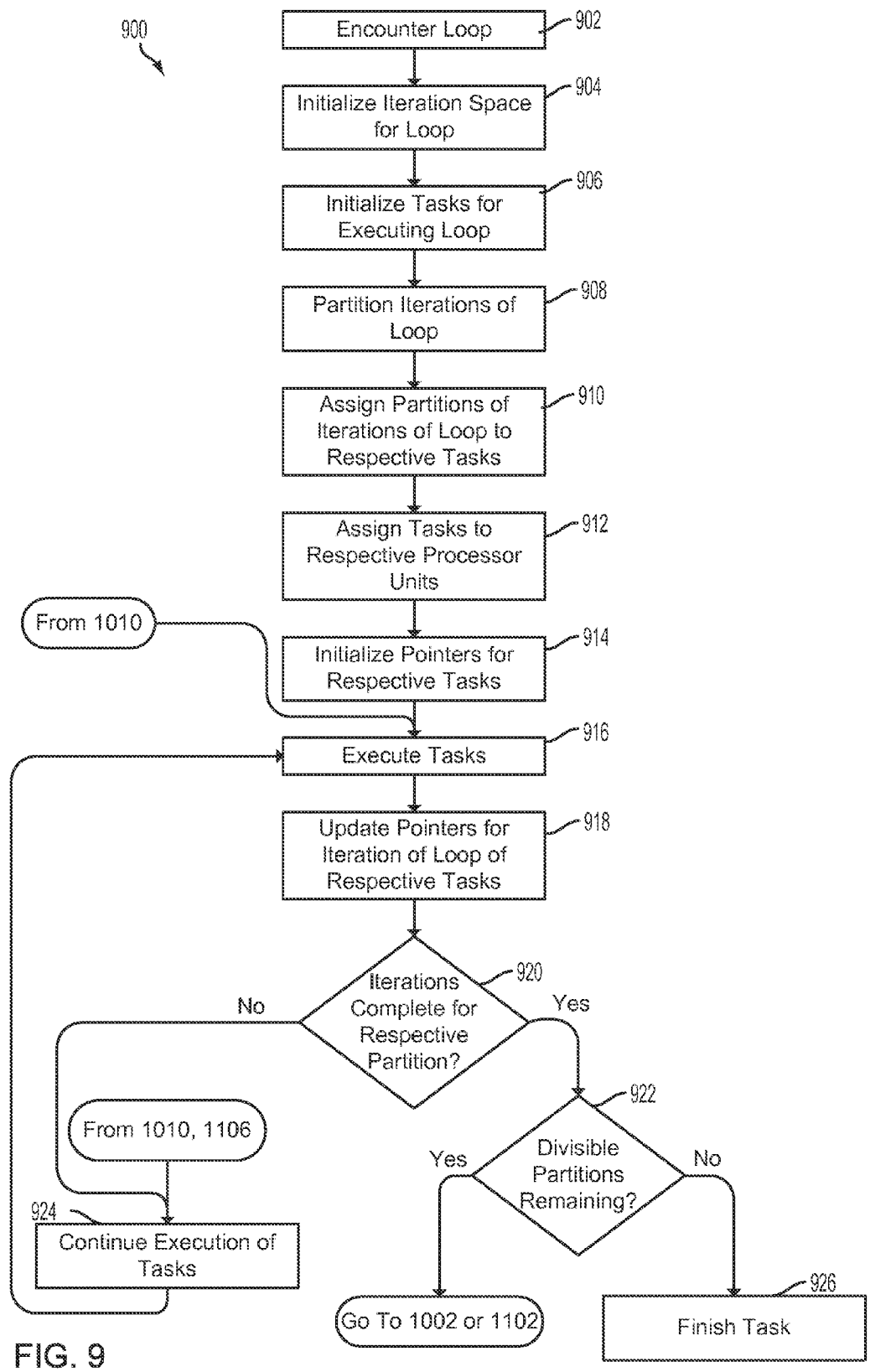
FIG. 9 is a process flow diagram illustrating an embodiment method for task-based handling of repetitive processes.

FIG. 9 illustrates an embodiment method 900 for task-based handling of repetitive processes. The method 900 may be executed by one or more processors or processor cores of the computing device. While running programs in a task-based run-time system, in block 902 the processor or processor core may encounter an repetitive process, or loop, in a program. In block 904, an iteration space for the repetitive process may be initialized with respect to a descriptor table and a status table. Iteration space initialization may include generation by a central controller (i.e., the iteration space splitter controller of FIG. 4), which may also be called an "ITSS controller," of an iteration space identifier, and information regarding the beginning and end criterion of the repetitive process, and a descriptor for a function to be executed at each iteration of the repetitive process. Initialization of descriptor table entries may further include calculation of the number of expected iterations. In some embodiments, a minimum split size may be defined by a processor or the programmer, and may indicated the smallest number of iterations contained in a partition of the repetitive process. The generated information may be stored in the descriptor table and status table as described with reference to FIGS. 5A-5C.

In block 906, one or more tasks may be initialized for executing the repetitive process in parallel across multiple processors or processor cores. The number of tasks initialized to execute the repetitive process may vary. In an embodiment, the number of tasks initialized may be equal to a number of available processors or processor cores to which the tasks may be assigned as further described below. In other embodiments, the number of tasks may be determined by one or more factors including characteristics of the processors or processor cores, characteristics of the program and/or the repetitive process, and states of the computing device, including temperature and power availability.

In block 908, the iterations of the repetitive process may be divided by the central controller into partitions for execution as part of the initialized tasks in parallel on the multiple processors or processor cores. In an embodiment, the number of partitions may be determined based on the number of initialized tasks, or available processors or processor cores. The makeup of each partition may be determined by various factors including characteristics of the processors or processor cores, characteristics of the program and/or the repetitive process, and states of the computing device, including temperature and power availability. The partitions may equally as possible divide the number of iterations of the repetitive process, or the partitions may be unequal in number of iterations of the repetitive process. In various embodiments, the number of iterations in each partition may be bounded by a minimum split size, which may be optionally defined during iteration space initialization. If no minimum split size is defined for an iteration space, then the number of iterations for each partition may have significant granularity, such as a partition size of one or more iterations.

In block 910, the partitions of the repetitive process may be assigned to respective tasks. In block 912, the initialized tasks, and thereby the respective partitioned iterations of the repetitive process, may be assigned to respective processors or processor cores. Assignment of tasks to processors or processor cores may include the central controller updating the status table to indicate which partitions are executing on which process or processor cores. In some embodiments, assignment of tasks to processors or processor cores may further include updating by the central controller or by local controllers associated with each of the processors or processor cores, a local table associated with each of the processors or processor cores to include start and end iteration criteria for the partition.

Much like initializing the tasks and partitioning the iterations, assignments to particular processors or processor cores may be determined by various factors including characteristics of the processors or processor cores, characteristics of the program and/or the repetitive process, and states of the computing device, including temperature and power availability.

In block 914, the processor or processor core may initialize a pointer (or other type of reference) for each task. The pointer may be accessible by a respective local controller and maintained in a respective local table. The pointer may be used to track the iterations of the repetitive processes so that the respective tasks know which iterations of the repetitive process to execute. In block 912, the assigned tasks may begin executing in parallel on the respective processors or processor cores to which the task are assigned. In block 918, the respective pointers for the tasks may be updated to reflect changes in the iterations of the repetitive processes of the executing tasks, such as completion or starting of an iteration if the repetitive processes.

In determination block 920, the processor or processor core may determine whether the iterations of the repetitive process for a respective task are complete. In response to determining that the iterations of the repetitive process for a respective task are incomplete, or that there are remaining iterations for execution (i.e., determination block 920="No"), the processor or processor core may continue to execute the respective task in block 924.

In response to determining that the iterations of the repetitive process for a respective task are complete, or that there are no remaining iterations for execution, (i.e., determination block 920="Yes"), the processor or processor core may determine whether the remaining iterations for another respective task are divisible in determination block 922. In determining whether the remaining iterations for the other respective task are divisible, the remaining iterations may be divisible when more than the executing iteration remain to be executed. Alternatively, the partition of the other respective task may be divisible if the remaining iterations number more than a defined minimum split size. The remaining iterations may be indivisible when only the executing iteration for the other respective task remains, or if the remaining iterations number fewer than a defined minimum split size.

In response to determining that the remaining iterations for the other respective task are divisible (i.e., determination block 922="Yes"), depending on the implemented scheme the processor or processor core may divide the remaining iterations of the repetitive process into subpartitions as described below in either method 1000 (see FIG. 10) or method 1100 (see FIG. 11). In response to determining that the remaining iterations for the respective task are indivisible (i.e., determination block 922="No"), the processor or processor core may finish the task in block 926, and may discard the task and await new work. In some embodiments, the central controller or relevant local controller may update the status table to indicate that the task has finished execution of all assigned iterations. In some embodiments, the central controller may remove the partition information and associated entries from the status table once the task has finished executing and no ongoing tasks have divisible partitions.

Figure 10:
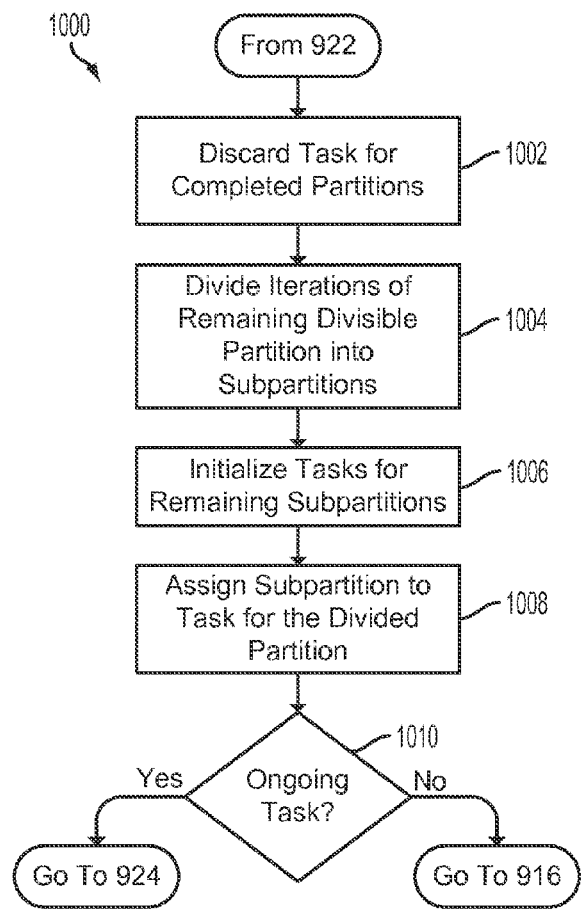
FIG. 10 is a process flow diagram illustrating an embodiment method for dividing a partition of repetitive process iterations into subpartitions in task-based handling of repetitive processes.

FIG. 10 illustrates an embodiment method 1000 for dividing a partition of repetitive process iterations into subpartitions in task-based handling of repetitive processes. The method 1000 may be executed by one or more processors or processor cores of the computing device. As described above with reference to FIG. 9, the method 1000 may be invoked in response to the processor determining that the iterations of the repetitive process for a respective task are complete (i.e., determination block 920="Yes") and that the remaining iterations for another respective task are divisible (i.e., determination block 922="Yes"). In other words, method 1000 may be invoked when a task running on a processor or processor core completes its execution and another task running on another processor or processor core is ongoing and has more iterations than just the executing iteration, or the minimum split size remaining.

In block 1002, the completed task may be discarded. In block 1004, the iterations of the ongoing task may be divided into subpartitions of the partition of iterations assigned to the ongoing task. The central controller may perform a lookup in the status table to determine the processors or processor cores that are still executing tasks associated with the iteration space identifier linked to the completed task. The central controller may then subpartition one or more of the partitions executing on other processors or processor cores and assign the one or more new partitions to the available processor core. The status table may be updated by the central controller, and a local table associated with the available processor or processor core may be updated to include ether new start and end execution criterion for the newly assigned partition. Similarly, the local table pointer may be reset so as to track the execution progress of the task through the iterations of the new partition. For example, a partition of iterations of a repetitive process assigned to a task may include 500 iterations. In such an example, the ongoing task may have executed 174 iterations, and the task may be executing the $175^{th}$ iteration, leaving 325 iterations yet to be executed.

With resources such as processor and processor cores being available to aid in executing these remaining iterations of the task, the remaining 325 iterations may be divided into subpartitions of the original 500 iteration partition or what is now the 325 remaining iterations partition. In this example, one or more processors or processor cores may be available, and the remaining 325 iterations may be divided up in any manner over any number of the available processors or processor cores. For instance, the remaining iterations may be divided equally or unequally over the available processors or processor cores, and it is possible that at least one available processor or processor core is not assigned a subpartition of the remaining iterations. Further, the processor or processor core executing the task with the remaining iterations may be assigned at least the executing iteration of the task at the time the remaining iterations are divided. How the remaining iterations are divided into subpartitions may depend on a variety of factors including whether a minimum split size was defined at the time of iteration space execution, characteristics of the processors or processor cores (e.g., relative processing speed, relative power efficiency/current leakage, etc.), characteristics of the program and/or the repetitive process, and states of the computing device, including temperature and power availability (e.g., on-battery or charging).

In block 1006 tasks may be initialized for the remaining unassigned subpartitions. In block 1008 one subpartition may be assigned to the ongoing task for which the iterations are being divided. Thus, all of the subpartitions get assigned to either the existing ongoing task or a newly initialized task for executing on the available processor(s) or process core(s).

In determination block 1010, the processor or processor core may determine whether the task is an ongoing task or a new task. In response to determining that the task is an ongoing task (i.e., determination block 1010="Yes"), the processor or processor core executing the ongoing task may continue executing the task in block 924 (see FIG. 9). In response to determining that the task is not an ongoing task (i.e., determination block 1010="No"), and thus is a new task, the processor or processor core assigned to execute the new task may execute the task in block 916 as described above with reference to FIG. 9.

Figure 11:
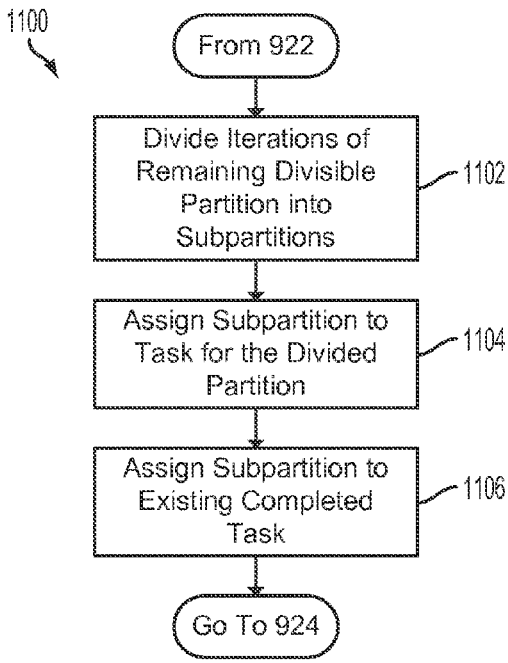
FIG. 11 is a process flow diagram illustrating an embodiment method for dividing a partition of repetitive process iterations into subpartitions in task-based handling of repetitive processes.

FIG. 11 illustrates an embodiment method 1100 for dividing a partition of repetitive process iterations into subpartitions for task-based handling of repetitive processes. With reference to FIGS. 1-11, the method 1100 may be executed by one or more processors or processor cores of the computing device. As described above with reference to FIG. 9, the method 1100 may be invoked in response to determining that the iterations of the repetitive process for a respective task are complete (i.e., determination block 920="Yes") and that the remaining iterations for another respective task are divisible (i.e., determination block 922="Yes"). In other words, method 1100 may be invoked when a task running on a processor or processor core completes its execution, and another task running on another processor or processor core is ongoing and has more iterations than just the executing iteration or a minimum split size remaining. This is similar to the method 1000 described with reference FIG. 10; however, rather than discard the competed tasks, as in block 1002 (see FIG. 10), the respective processors or processor cores may retain the completed tasks to execute for reassigned iterations of the repetitive process.

In block 1102, the remaining iterations of an ongoing task may be divided into subpartitions much like in block 1004 described above with reference to FIG. 10. In block 1104, one of the subpartitions containing portions of the remaining iterations of the ongoing task may be assigned to the ongoing task to complete executing a reduced portion of its original partition of the iterations of the repetitive process. In block 1106, the remaining unassigned subpartitions may be assigned to the existing completed tasks. Thus, all of the subpartitions get assigned to either the existing ongoing task or an existing completed task for executing on the available processor(s) or process core(s). The processor or processor core for executing each task may proceed to continue executing the task in block 924 as described above with reference to FIG. 9.

Figure 12:
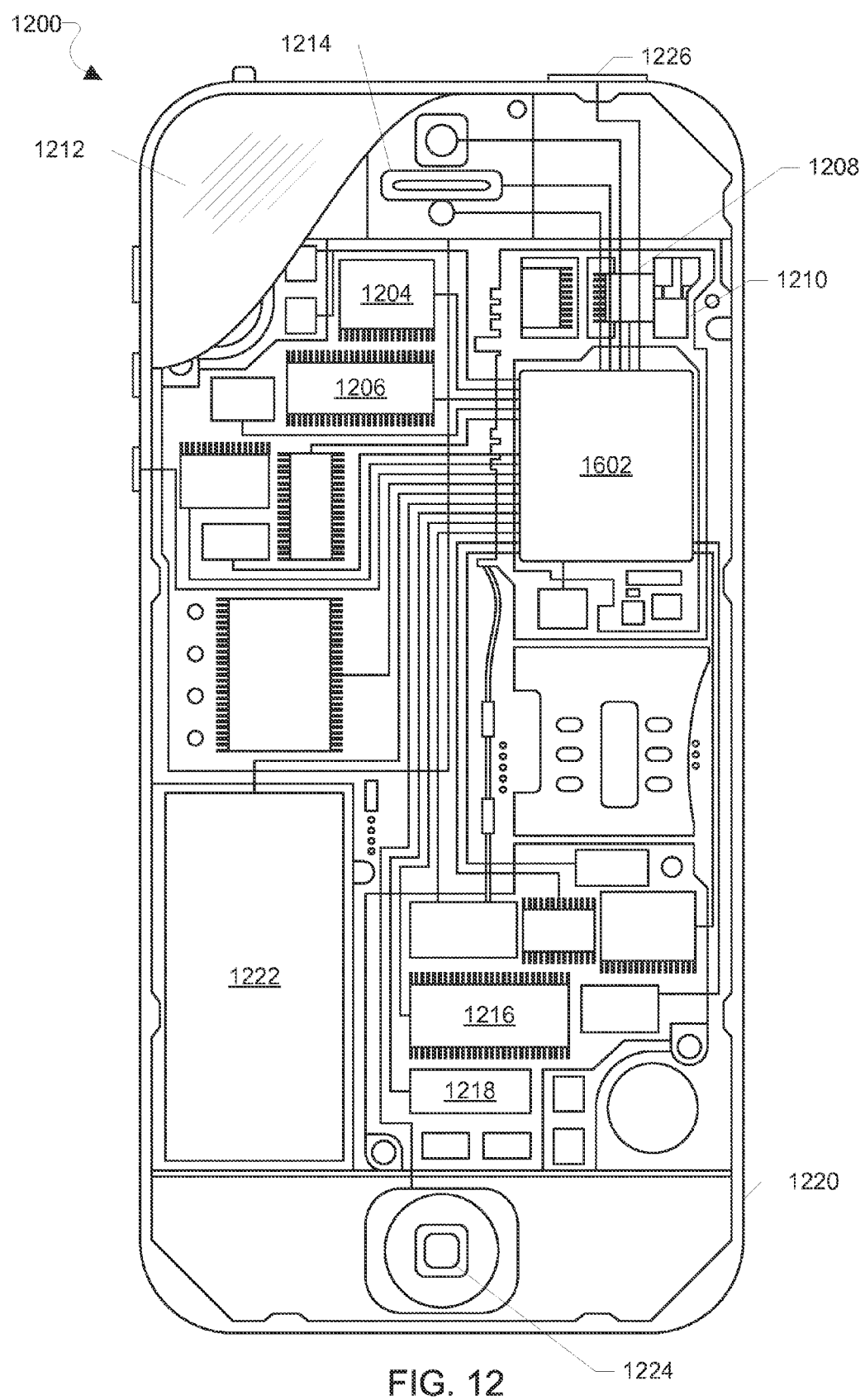
FIG. 12 is component block diagram illustrating an example of a computing device suitable for use with the various embodiments.

FIG. 12 illustrates an example of a computing device suitable for implementing the various embodiments, for instance, some or all of the methods illustrated in FIGS. 9-11. A smartphone computing device 1200 may include a multi-core processor 1202 coupled to a touchscreen controller 1204 and an internal memory 1206. The multi-core processor 1202 may be one or more multi-core integrated circuits designated for general or specific processing tasks. The internal memory 1206 may be volatile or non-volatile memory, and may also be secure and/or encrypted memory, or unsecure and/or unencrypted memory, or any combination thereof. The touchscreen controller 1204 and the multi-core processor 1202 may also be coupled to a touchscreen panel 1212, such as a resistive-sensing touchscreen, capacitive-sensing touchscreen, infrared sensing touchscreen, etc. Additionally, the display of the computing device 1200 need not have touch screen capability.

The smartphone computing device 1200 may have one or more radio signal transceivers 1208 (e.g., Peanut, Bluetooth, Zigbee, Wi-Fi, RF radio) and antennae 1210, for sending and receiving communications, coupled to each other and/or to the multi-core processor 1202. The transceivers 1208 and antennae 1210 may be used with the above-mentioned circuitry to implement the various wireless transmission protocol stacks and interfaces. The smartphone computing device 1200 may include a cellular network wireless modem chip 1216 that enables communication via a cellular network and is coupled to the processor.

The smartphone computing device 1200 may include a peripheral device connection interface 1218 coupled to the multi-core processor 1202. The peripheral device connection interface 1218 may be singularly configured to accept one type of connection, or may be configured to accept various types of physical and communication connections, common or proprietary, such as USB, FireWire, Thunderbolt, or PCIe. The peripheral device connection interface 1218 may also be coupled to a similarly configured peripheral device connection port (not shown).

The smartphone computing device 1200 may also include speakers 1214 for providing audio outputs. The smartphone computing device 1200 may also include a housing 1220, constructed of a plastic, metal, or a combination of materials, for containing all or some of the components discussed herein. The smartphone computing device 1200 may include a power source 1222 coupled to the multi-core processor 1202, such as a disposable or rechargeable battery. The rechargeable battery may also be coupled to the peripheral device connection port to receive a charging current from a source external to the smartphone computing device 1200. The smartphone computing device 1200 may also include a physical button 1224 for receiving user inputs. The smartphone computing device 1200 may also include a power button 1226 for turning the smartphone computing device 1200 on and off.

Figure 13:
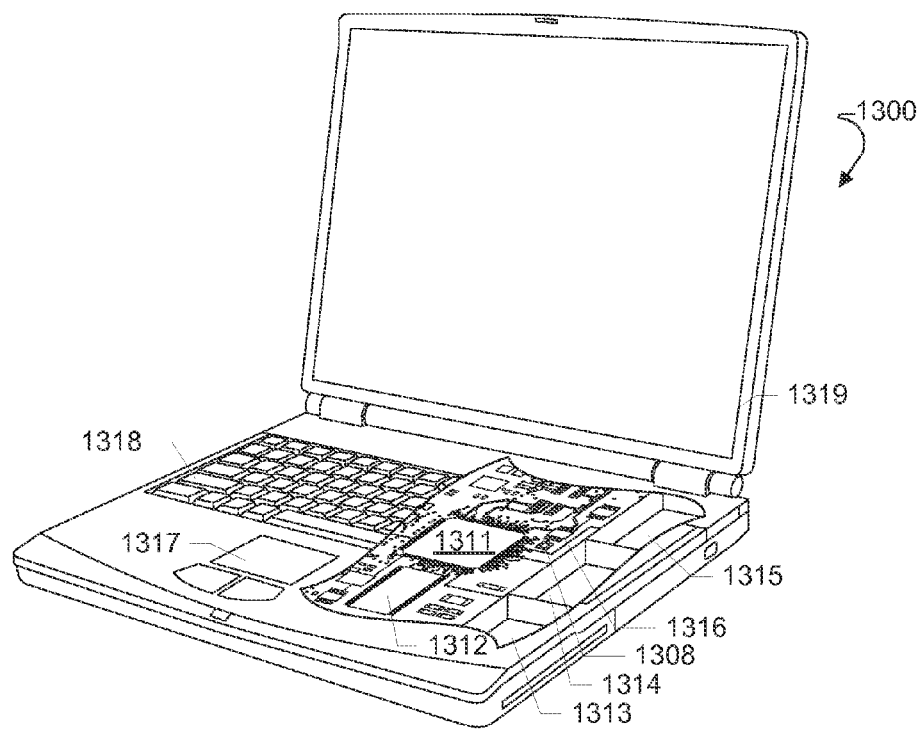
FIG. 13 is component block diagram illustrating another example computing device suitable for use with the various embodiments.

The various embodiments described above, for instance, some or all of the methods illustrated in FIGS. 9-11, may also be implemented within a variety of other computing devices, such as a laptop computer 1300 illustrated in FIG. 13. With reference to FIGS. 1-13, a laptop computer may include a touchpad touch surface 1317 that serves as the computer's pointing device, and thus may receive drag, scroll, and flick gestures similar to those implemented on computing devices equipped with a touch screen display and described above. A laptop computer 1300 will typically include a multi-core processor 1311 coupled to volatile memory 1312 and a large capacity nonvolatile memory, such as a disk drive 1313 of Flash memory. Additionally, the computer 1300 may have one or more antenna 1308 for sending and receiving electromagnetic radiation that may be connected to a wireless data link and/or cellular telephone transceiver 1316 coupled to the multi-core processor 1311. The computer 1300 may also include a floppy disc drive 1314 and a compact disc (CD) drive 1315 coupled to the multi-core processor 1311. In a notebook configuration, the computer housing includes the touchpad 1317, the keyboard 1318, and the display 1319 all coupled to the multi-core processor 1311. Other configurations of the computing device may include a computer mouse or trackball coupled to the processor (e.g., via a USB input) as are well known, which may also be use in conjunction with the various embodiments. A desktop computer may similarly include these computing device components in various configurations, including separating and combining the components in one or more separate but connectable parts.

Figure 14:
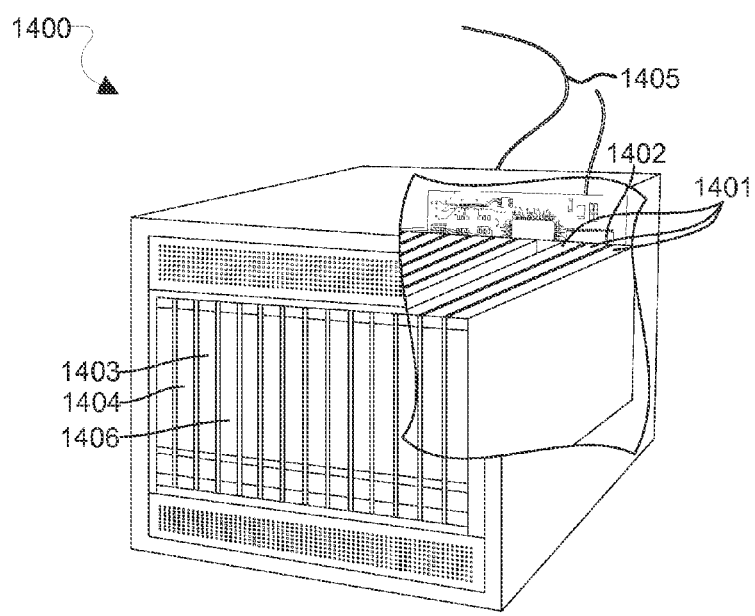
FIG. 14 is component block diagram illustrating an example server device suitable for use with the various embodiments.

The various embodiments, for instance, some or all of the methods illustrated in FIGS. 9-11, may also be implemented on any of a variety of commercially available server devices, such as the server 1800 illustrated in FIG. 14. With reference to FIGS. 1-14, a server 1400 typically includes one or more multi-core processor assemblies 1401 coupled to volatile memory 1402 and a large capacity nonvolatile memory, such as a disk drive 1804. As illustrated in FIG. 14, multi-core processor assemblies 1401 may be added to the server 1400 by inserting them into the racks of the assembly. The server 1400 may also include a floppy disc drive, compact disc (CD) or DVD disc drive 1406 coupled to the processor 1401. The server 1400 may also include network access ports 1403 coupled to the multi-core processor assemblies 1401 for establishing network interface connections with a network 1405, such as a local area network coupled to other broadcast system computers and servers, the Internet, the public switched telephone network, and/or a cellular data network (e.g., CDMA, TDMA, GSM, PCS, 3G, 4G, LTE, or any other type of cellular data network).

Computer program code or "program code" for execution on a programmable processor for carrying out operations of the various embodiments may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

Many computing devices operating system kernels are organized into a user space (in which non-privileged code runs) and a kernel space (in which privileged code runs). This separation is of particular importance in Android and other general public license (GPL) environments where code that is part of the kernel space must be GPL licensed, while code running in the user-space may not be GPL licensed. It should be understood that the various software components/modules discussed here may be implemented in either the kernel space or the user space, unless expressly stated otherwise.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the various embodiments may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or a non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc, wherein disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of task-based handling of repetitive processes, comprising:
    initializing, by a central controller, a set of descriptor table entries for maintaining in a descriptor table, wherein the descriptor table entries are for iteration space information of a repetitive process ready for execution;
    initializing, by the central controller, a set of status table entries for maintaining in a status table, wherein the status table entries are for iteration space information of the repetitive process;
    partitioning, by the central controller, iterations of the repetitive process into a first plurality of partitions;
    initializing, by the central controller, a first task for executing iterations of a first partition;
    initializing, by the central controller, a second task for executing iterations of a second partition;
    assigning, by the central controller, the first task to execute by a first processor or processor core and the second task to execute by a second processor or processor core in parallel;
    updating, by multiple local controllers each associated with one of the first and second processors or processor cores, multiple local tables to include partition execution status information for a task assigned to execute on the respective processor or processor core, wherein each table is associated with one of the first and second processors or processor cores;
    executing the first task by the first processor or processor core and executing the second task by the second processor or processor core in parallel;
    completing, by the second processor or processor core, execution of the second task;
    updating, by the local controller associated with the second processor or processor core, the local table associated with the second processor or processor core to indicate that the second task has finished execution;
    updating, by the central controller, the status table to indicate that the second task has finished completion and the second processor or processor core is available;
    determining, by the central controller, whether the first partition is divisible; and
    partitioning, by the central controller, the first partition of the first task into a second plurality of partitions in response to determining that the first partition is divisible.

2. The method of claim 1, further comprising:
    assigning, by the central controller, a third partition of the second plurality of partitions to the second task for execution, and a fourth partition of the second plurality of partitions to the first task for execution;
    updating, by the central controller, the status table with at least additional number of partitions, task assignment information, and task iteration status; and
    updating, by multiple local controllers, each local controller associated with one of the first and second processors or processor cores, multiple local tables, each table associated with one of the first and second processors or processor cores, to include updated partition execution information for a task assigned to execute on the respective processor core.

3. The method of claim 1, wherein each of the partitions of the second plurality of partitions may be of any size.

4. The method of claim 1, wherein determining whether the first partition is divisible further comprises determining, by the central controller, whether the remaining iterations of partitions assigned to the first task exceeds a minimum threshold.

5. The method of claim 1, further comprising partitioning, by the central controller of the processor, the iterations of the repetitive process by a number of partitions equivalent to a number of available processors or processor cores.

6. The method of claim 1, further comprising:
    initializing, by the local controller associated with the first processor or processor core, a first pointer in the local table associated with the first processor or processor core for the first task;
    updating, by the local controller of the first processor or processor core, the first pointer to indicate execution of the iterations of the repetitive process of the first partition; and updating, by the central controller, an execution status of the first partition in the status table.

7. The method of claim 1, further comprising:
determining, by the local controller of the first processor or processor core, that an end iteration criterion for the first partition is invalid;
updating, by the local controller of the first processor or processor core, a local table associated with the first processor or processor core to reflect the new end iteration criterion for the first partition; and
updating, by the central controller, the status table with the new end iteration criterion for the first partition.

8. The method of claim 1, wherein updating any of the local tables further comprises requesting, by the central controller, partition information contained in a local table.

9. The method of claim 1, wherein updating any of the local tables further comprises passing, by the local controller of a respective processor or processor core, information updated in a local table to the status table at predetermined intervals or in response to an event.

10. The method of claim 1, wherein the status table or any of the local tables may be updated without interrupting execution of tasks by the first and second processors or processor cores.

11. The method of claim 1, further comprising:
completing, by the first and second processors or processor cores, execution of all partitions of the repetitive process;
deleting, by the local controllers of the multiple processor cores, partition entries associated with the repetitive process from each of the local tables; and
deleting, by the central controller, iteration space information from the status table and the descriptor table.

12. A multi-technology communication device, comprising:
multiple processors or processor cores configured with processor-executable instructions to perform operations comprising:
initializing in a descriptor table a set of descriptor table entries for iteration space information of a repetitive process ready for execution;
initializing in a status table a set of status table entries for iteration space information of the repetitive process;
partitioning iterations of the repetitive process into a first plurality of partitions;
initializing a first task for executing iterations of a first partition;
initializing a second task for executing iterations of a second partition;
assigning the first task to execute by a first processor or processor core and the second task to execute by a second processor or processor core in parallel;
updating multiple local tables to include partition execution status information for a task assigned to execute on the respective processor or processor core, wherein each table is associated with one of the first and second processors or processor cores;
executing the first task by the first processor or processor core and executing the second task by the second processor or processor core in parallel, wherein at least one of the first and second processors or processor cores is further configured with processor-executable instructions to perform operations comprising:
completing execution of the second task;
updating the local table associated with the second processor or processor core to indicate that the second task has finished execution;
updating the status table to indicate that the second task has finished completion and the second processor or processor core is available;
determining whether the first partition is divisible; and
partitioning the first partition of the first task into a second plurality of partitions in response to determining that the first partition is divisible.

13. The multi-technology communication device of claim 12, wherein at least one of the first and second processors or processor cores is further configured with processor-executable instructions to perform operations comprising:
assigning a third partition of the second plurality of partitions to the second task for execution, and a fourth partition of the second plurality of partitions to the first task for execution;
updating the status table with at least additional number of partitions, task assignment information, and task iteration status; and
updating each local controller associated with one of the first and second processors or processor cores, multiple local tables, each table associated with one of the first and second processors or processor cores, to include updated partition execution information for a task assigned to execute on the respective processor core.

14. The multi-technology communication device of claim 12, wherein each partition of the second plurality of partitions may be of any size.

15. The multi-technology communication device of claim 12, wherein at least one of the first and second processors or processor cores is further configured with processor-executable instructions to perform operations comprising:
initializing a first pointer in the local table associated with the first processor or processor core for the first task;
updating the first pointer to indicate execution of the iterations of the repetitive process of the first partition; and
updating an execution status of the first partition in the status table.

16. The multi-technology communication device of claim 12, wherein at least one of the first and second processors or processor cores is further configured with processor-executable instructions to perform operations comprising:
determining that an end iteration criterion for the first partition is invalid;
updating a local table associated with the first processor or processor core to reflect the new end iteration criterion for the first partition; and
updating the status table with the new end iteration criterion for the first partition.

17. The multi-technology communication device of claim 12, wherein the status table or any of the local tables may be updated without interrupting execution of tasks by the first and second processors or processor cores.

18. A non transitory processor-readable medium having stored thereon processor-executable software instructions to cause a processor of a multi-technology communication device to perform operations comprising:
initializing a set of descriptor table entries for iteration space information of a repetitive process ready for execution;
initializing a set of status table entries for iteration space information of the repetitive process;

partitioning iterations of the repetitive process into a first plurality of partitions;
initializing a first task for executing iterations of a first partition;
initializing a second task for executing iterations of a second partition;
assigning the first task to execute by a first processor or processor core and the second task to execute by a second processor or processor core in parallel;
updating multiple local tables to include partition execution status information for a task assigned to execute on the respective processor or processor core, wherein each table is associated with one of the first and second processors or processor cores;
executing the first task by the first processor or processor core and executing the second task by the second processor or processor core in parallel;
completing, by the second processor or processor core, execution of the second task;
updating the local table associated with the second processor or processor core to indicate that the second task has finished execution;
updating the status table to indicate that the second task has finished completion and the second processor or processor core is available;
determining whether the first partition is divisible; and
partitioning the first partition of the first task into a second plurality of partitions in response to determining that the first partition is divisible.

* * * * *